United States Patent Office

3,767,633
Patented Oct. 23, 1973

3,767,633
HIGH TEMPERATURE POLYMERIZATION PROCESS AND VINYL CHLORIDE POLYMER PRODUCTS THEREFROM
Joseph J. Dietrich, Mentor, Ohio, assignor to Diamond Shamrock Corporation, Cleveland, Ohio
No Drawing. Continuation-in-part of abandoned application Ser. No. 761,840, Sept. 23, 1968. This application Sept. 15, 1971, Ser. No. 180,848
Int. Cl. C08f *3/30, 15/06, 15/30*
U.S. Cl. 260—87.1                                       7 Claims

ABSTRACT OF THE DISCLOSURE

Vinyl chloride, or mixtures thereof with at least one monomer copolymerizable therewith are polymerized in aqueous suspension in the presence of a free-radical type initiator, employing polymerization temperatures of from 90° C. to 165° C. and reaction pressures ranging up to 5000 p.s.i.g. The thermally-stable polymeric products obtained exhibit useful properties, although of extremely low average molecular weight. In the process, particularly at the upper range of the polymerization temperatures utilized, addition of the vinyl chloride monomer is found to proceed equally by head-to-head coupling (or tail-to-tail coupling) as by the usual head-to-tail addition effected in conventional polymerization processes. Depending upon their composition, the vinyl chloride polymer products are useful, e.g., as adhesives, as flame retardants, as processing aids for other polymers, as coating resins and in formulations for vinyl foam and flooring products.

BACKGROUND OF THE INVENTION

This application is a continuation-in-part of my copending application, U.S. Ser. No. 761,840, filed Sept. 23, 1968, and now abandoned.

This invention relates to useful, easily processed vinyl chloride homopolymers and random copolymers having unexpected thermal stability. More particularly, it relates to an aqueous suspension polymerization process from which vinyl chloride polymeric products having unique structural characteristics are obtained. Still more particularly, this invention relates to certain low molecular weight vinyl chloride polymeric materials which are structurally different from vinyl chloride polymers heretofore known in the art.

Homopolymers of vinyl chloride and copolymers thereof with other ethylenically unsaturated monomers copolymerizable therewith have long been known in the art and are presently utiilzed in a wide variety of applications by the plastics industry. They may be prepared by different methods or techniques fully described heretofore in numerous patents and technical articles. These different methods are generally designated as the mass or bulk polymerization of the monomer or monomer mixture or as the polymerization thereof in solution, in aqueous emulsion, or in aqueous suspension. In any of the methods, polymerization is accelerated primarily by contacting the monomer or monomer mixture with suitable free-radical generating polymerization catalysts. However, because higher yields of polymeric product can generally be realized more economically and conveniently from aqueous emulsion or suspension processes, it has been preferred, in commercial practice, to prepare vinyl chloride polymers chiefly by these techniques.

In aqueous suspension polymerization methods as effectively practiced heretofore in the art on a commercial scale, the vinyl chloride monomer or mixture thereof with one or more suitable comonomers copolymerizable therewith typically is contacted with a free-radical generating compound as polymerization initiator while being maintained in stable suspension in an aqueous medium with the aid of a suitable suspending or dispersing agent. The reaction mixture, which typically has a total volume amounting to at least 80% of reactor capacity, then is maintained under pressure and at varying temperatures for different time periods depending upon, for example, the particular initiator employed and the average molecular weight desired for the finished polymer product. The reaction temperatures utilized range generally from about 20° to 100° C., preferably from 20° to 80° C., and the total reaction time may range up to 24 hours or even longer.

It has now been found that by employing polymerization temperatures ranging from 90° to 165° C. in aqueous suspension processes for the preparation of vinyl chloride polymeric products from vinyl chloride or from a monomeric mixture of vinyl chloride and an ethylenically unsaturated monomer copolymerizable therewith, useful polymer materials are obtained which possess certain unique structural characteristics and exhibit unexpected processing properties.

SUMMARY OF THE INVENTION

Accordingly, the present invention encompasses an easily operated, commercially attractive process for preparing vinyl chloride polymer products in an aqueous suspension polymerization process, essentially as known and practiced heretofore in the art, with the exception that the polymerization temperatures employed herein range generally from 90° to 165° C. instead of the lower temperatures now utilized in conventional methods. Likewise, substantially liquid-fully reactor conditions preferably are used.

The low-molecular weight polymer products obtained are, as expected, more highly branched than conventional polymers because of the much higher reaction temperatures employed in their preparation. Unexpectedly, however, the branched chains of these materials as derived from vinyl chloride monomer are found, by analysis, to contain a much higher number of terminating chloromethylene (—$CH_2Cl$) groups by comparison to conventional polyvinyl chloride wherein the branch-terminating groups are predominantly methyl (—$CH_3$) groups. As will be described more fully hereinafter, the significant number of branch-terminating —$CH_2Cl$ groups present in the polymer products of this invention suggests that monomer addition is frequently effected herein in a different manner from that occurring in conventional polymerization processes.

The vinyl chloride homopolymer and copolymer products of the process of this invention are useful in a wide variety of applications wherein conventional vinyl chloride polymers are now being used. The ease of operating the process and, especially, the preparation of useful products therefrom are unexpected and surprising since it had generally been assumed heretofore that only thermally degraded vinyl chloride polymers would be obtained by using such high polymerization temperatures. Further, it was generally deemed unfeasible to polymerize vinyl chloride at such high temperatures because of the extremely high operating pressures required.

As stated earlier herein, the polymeric products of this invention are adapted for use in many different plastics applications. The vinyl chloride homopolymers, for example, presently may be employed as adhesive, as flame retarding additives, and as processing aids for other polymers. They may also be applied as the resinous component in certain vinyl flooring products and in the production of rigid vinyl foams.

The random copolymers presently fined particular use as process modifiers and as the resinous component in vinyl flooring products and phonograph records.

DESCRIPTION OF THE PREFERRED EMBODIMENTS

As used herein in the specification and claims, the terms "vinyl polymers," "vinyl chloride polymers," "vinyl polymer products" and "vinyl polymeric products" are intended to refer to homopolymers of vinyl chloride and random copolymers thereof with one or more monoethylenically unsaturated monomers copolymerizable therewith at the reaction conditions utilized in the process. Specific types of comonomers which suitably may be employed include olefins of 2 to 4 carbon atoms, i.e., ethylene, propylene or butene-1; monoolefinically unsaturated carboxylic acids containing 3 or 4 carbon atoms, as acrylic acid or methacrylic acid; lower alkyl esters of acrylic and methacrylic acid as well as the hydroxy- and amino-substituted derivatives thereof; vinyl esters of either straight-chain or branched monocarboxylic acids having 2 to 12 carbon atoms; maleic anhydride and the diesters of maleic acid and fumaric acid with aliphatic alcohols containing up to 18 carbon atoms. Random copolymers of vinyl chloride with styrene or suitable derivatives thereof, e.g., p-chlorostyrene or p-tert-butylstyrene may also be obtained by the process herein. The preparation of these particular copolymer materials is totally unexpected in view of the fact that they have not been easily prepared heretofore by aqueous suspension polymerization methods due to the vast difference between the reactivities of the two monomers in the polymerization system.

In general, the random copolymer products of this invention may contain, by weight, from about 50% to 99.5%, preferably from about 85% to 99% of polymerized vinyl chloride and from 0.5% to 50%, preferably from 1% to 15% of the polymerized comonomer. The presently preferred products are those containing vinyl chloride copolymerized with either propylene or vinyl acetate, as these materials can best be adapted to a wide variety of applications.

The process of this invention is conducted in any suitable reactor which is equipped with agitation means and which is constructed of corrosion-resistant material, e.g., stainless steel. The reactor is adapted to withstand pressures which are at least equivalent, if not greater than the vapor pressure of the monomer or monomer mixture at the polymerization temperature. Stainless steel reactors which are rated at 500–5000 p.s.i.g. have been found to be very efficient and completely satisfactory herein as polymerization vessels.

In general, the process is conducted at a temperature ranging from 90° to 165° C. and at a pressure which is at least equivalent to the vapor pressure of the vinyl chloride monomer or of the monomer mixture at the particular polymerization temperature employed. The required reactor pressure is attained by pumping in a sufficient quantity of water. In the preferred embodiments of the invention as presently practiced, the reactor normally is maintained substantially liquid-full after the polymerization temperature has been reached and before any catalyst is added. Accordingly, the reactor pressure will be substantially above the vapor pressure of the monomer. This practice is presently preferred because in the equipment used, thermally degraded polymer product can easily build up on the reactor walls above the liquid surface due to the excessively high polymerization temperatures employed. However, by employing a method whereby sites of excessive catalyst concentration will not develop, e.g., by adding the catalyst below the surface of the reaction mixture, the process conceivably does not have to be conducted with substantially liquid-full reactor conditions in order to obtain nondegraded products.

In carrying out the process, the total quantity of polymerization initiator required may be charged into the reaction mixture at the beginning of the reaction; or alternatively, the quantity of initiator required may be continuously charged as the reaction progresses. In present practice, it is preferred to add the initiator continuously as this technique serves to control the rate of reaction, thereby also controlling the reaction temperature indirectly. Further, the method of continuous or incremental initiator addition makes it possible to utilize many peroxy compounds which are extremely unstable at the polymerization temperatures employed. If totally charged initially in the reaction, such compounds would decompose very quickly and be ineffective for initiating polymerization. Also, in decomposing, they might become explosive in nature, presenting a safety hazard. Of course, it is to be understood that the polymerization initiator may be added initially to the reaction mixture, provided that it is not too unstable at the polymerization temperature, having a "half-life," i.e., decomposition rate, which is sufficiently slow so that it will generate free radicals long enough to sustain the polymerization reaction to substantial completion.

The initiators suitably employed herein may be any of the presently available monomer-soluble, free-radical initiators which have normally been employed heretofore for polymerizing, e.g., vinyl chloride in aqueous suspension, providing these compounds have suitable decomposition rates at the polymerization temperatures and are reasonably stable in storage and handling. In selecting the initiator, its "half-life" at the polymerization temperature is of primary importance. This property should be slow enough so that the initiator can be dispersed throughout the reaction mixture before decomposing. On the other hand, the "half-life" should be short enough so that the initiator is essentially all destroyed during polymerization and none remains in the finished polymeric product to cause its decomposition during processing. Depending upon the particular polymerization temperature employed, specific suitable initiators include 2,4-dichlorobenzoyl peroxide, caprylyl peroxide, lauroyl peroxide, tertiary butyl peroxyisobutyrate, tertiary butyl peroxypivalate, benzoyl peroxide, p-chlorobenzoyl peroxide, hydroxyheptyl peroxide, cyclohexanone peroxide, ditertiary butyl diperphthalate, tertiary butyl peracetate, tertiary butyl perbenzoate, dicumyl peroxide, tertiary butyl hydroperoxide, methyl ethyl ketone peroxide, ditertiary butyl peroxide, acetyl cyclohexane sulfonyl peroxide, di(sec-butyl)peroxy dicarbonate and isobutyryl peroxide. Of these compounds, those which are especially suitable for utilization in the presently preferred embodiments of this invention wherein the initiator is incrementally injected, have a "half-life" within the polymerization temperature range generally from 0.1 second to 12 minutes, preferably from 0.5 minute to 5 minutes. Specific such presently preferred initiators include, for example, benzoyl peroxide, tertiary butyl peroxypivalate, lauroyl peroxide, 2,4-dichlorobenzoyl peroxide, caprylyl peroxide, tertiary butyl peracetate and p-chlorobenzoyl peroxide.

The overall concentration of initiator employed ranges generally from 0.01 percent to 2.0 percent, based on the total monomer charge. The preferred concentration of initiator is 0.05 percent to 0.5 percent, by weight of the monomer.

Other than the significantly elevated polymerization temperatures employed, preferably with reaction pressures which assure substantially liquid-full reactor conditions, the process of this invention generally is conducted similarly to aqueous suspension polymerizations as now known in the art. From about 0.4 to 6 parts water may be employed for each part of vinyl chloride monomer or monomer mixture thereof. Preferably, a water-to-monomer ratio of 0.5 to 2:1 is used.

The suspending agent suitably employed for maintaining a stable suspension of monomer in the aqueous medium necessarily should be both thermally stable and completely soluble at the polymerization temperatures. Suitable suspending agents presently include, for example, polyvinyl alcohol, certain of the carboxymethyl cellulose materials, polyvinyl pyrrolidone homopolymers and copolymers and nonionic alkylene oxide-alkylene glycol products. The concentration of suspending agent employed ranges generally from 0.05 to 4 percent, by weight, of the monomer or monomer mixture. Preferably, the concentration of suspending agent ranges from 0.1 to 2.0 percent, by weight, of the monomer or monomer mixture and still more prefererably ranges from 0.2 to 1.0 percent, by weight thereof.

The process of this invention is conducted generally at a temperature ranging from 90° to 165° C. As is expected, the polymeric products produced at the upper limits of this temperature range are of lower average polymer molecular weight and more highly branched than are the products produced at the lower limits. Reduced viscosity measurements are generally employed herein to indicate the comparative average polymer molecular weight of the products. Intrinsic viscosity values and the number average molecular weights of the products, by comparison to conventionally prepared polymers, indicate the degree of branching therein. Procedures for determining each of these values are described hereinafter.

The reaction may be conducted over a wide pressure range. The minimum pressure exerted must be at least equivalent to the vapor pressure of the monomer or monomer mixture at the polymerization temperature. The maximum pressure, of course, will be limited by the pressure rating of the reactor. In general, pressures employed may range from 400 to 5000 p.s.i.g., with pressures ranging from 500 to 1500 p.s.i.g. being typical.

Depending upon the specific polymerization temperature, the particular initiator and initiator concentration employed, the process of this invention generally may be conducted in a time period of from 1 to about 12 hours. The polymerization rate, i.e., the total reaction time, likewise will be influenced by the efficiency with which the heat of reaction is removed from the polymerization mixture. Presently, removal of this exothermic heat can best be accomplished by utilizing jacketed reactors or, more advantageously, by submerging in the reaction mixture a coil through which cold water may be passed. In the presently preferred embodiments of the process wherein such a cooling coil is employed and wherein the initiator is added in increments throughout the reaction, 90% to 95% monomer conversion may be realized in a time period ranging from 1 to 3 hours. It is to be understood, of course, that it is possible to obtain such high monomer conversions in minimum reaction times because no vinyl chloride monomer exists in a vapor phase due to the substantially liquid-full reactor conditions employed.

As can be easily recognized by those skilled in the art, the process of this invention provides an extremely fast, efficient and commercially attractive method for producing low molecular weight vinyl chloride polymeric materials for diverse application. It also makes possible the preparation of copolymers from vinyl chloride and much less reactive comonomers which are extremely difficult or impossible to make under conventional polymerization conditions at lower reaction temperatures. Further, by practice of the process, higher yields of product may be realized as the reactor capacity is increased almost 25 percent, on a volume basis. The absence of resin build-up on reactor walls and the preparation of nonthermally degraded product is assured as there is no liquid-vapor interface in the reactor for accumulation of burned resin product. A further important advantage of the process is the fact that no chain transfer agents need to be employed in order to produce low molecular weight resin.

In preferred embodiments herein in which an initiator with a relatively short half-life is introduced into the reactor in increments during the reaction, the polymerization rate is easily controlled or interrupted by merely stopping initiator injection.

As previously described herein, the vinyl chloride polymer products prepared by the process of this invention are found to contain, by comparison to conventionally-prepared polyvinyl chloride, a much greater degree of branching. Further, there is a significantly greater number of —$CH_2Cl$ groups terminating the branched chains of these polymers rather than —$CH_3$ groups which are the predominant branch-terminating groups in conventionally prepared polymers.

The significant number of branch-terminating —$CH_2Cl$ groups in the vinyl chloride polymers of this invention is believed to result from the elevated temperatures employed in their preparation. At these higher temperatures, the energy, i.e., the instability of CHCl· radical becomes equivalent to that of the $CH_2$· radical. Thus, the ability of the CHCl· radical to abstract hydrogen and terminate becomes equivalent to that of the $CH_2$· radical and a greater number of chain branches in the polymer formed can be terminated by —$CH_2Cl$ groups. In conventional polymerization processes at lower temperatures, the majority of chain terminating groups are —$CH_3$ groups. This is the case because in these processes, the —$CH_2$· radical in a growing polymer chain has higher energy, i.e., is more reactive than a —CHCl· radical, and has a greater tendency to abstract hydrogen and terminate. The CHCl· radical, of lower energy, has the greater tendency to propagate further polymerization.

Further, as the energy of the $CH_2$· and CHCl· propagating radicals are more equivalent at the higher reaction temperatures utilized in the process of this invention, these radicals will perform much less preferentially for head-to-tail addition. Thus, the order of monomer addition will be more random with no discrimination or preference made for either end of the $H_2C=CHCl$ monomer. Accordingly, it is believed that the polymer products of this invention contain a significant portion of vinyl chloride monomer sequences joined through head-to-head and tail-to-tail addition, as well as those developed from the normal head-to-tail addition.

To quantitatively measure the number of branch terminating —$CH_2Cl$ groups in the polymers of the invention, both vinyl chloride homopolymer products of the invention and representative samples of conventionally-prepared vinyl chloride homopolymers of varying average molecular weights were analyzed for terminating methyl (—$CH_3$) group content by infrared (IR) technique. These samples were analyzed both before and after being reduced by the standard, well-known reductive hydrogenation method using lithium aluminum hydride ($LiAlH_4$) catalyst. Details of the experimental procedures carried out are described more in detail hereinafter by specific example.

Results of the tacticity analyses by IR indicate that conventional PVC is slightly more syndiotactic than the polymer products of this invention. Also, the experimental results show that in the branches of conventional vinyl chloride polymers, the monomeric units adjacent to the terminating —$CH_3$ groups are predominantly of head-to-head configuration as evidenced by the fact that approximately equivalent values are obtained for the number of —$CH_3$ groups/1000 $CH_2$ groups for these polymers both before and after reduction. As designated herein, conventional vinyl chloride polymers are those prepared at polymerization temperatures of 0° to 90° C., preferably from 20° to 80° C. The terminating —$CH_3$ group content in such unreduced polymers averages about 9 to 10 —$CH_3$—1000 $CH_2$. Analysis of these polymers after reduction yields values of about 10 to 13 —$CH_3$/1000 $CH_2$. Since chlorine (Cl) is replaced by hydrogen (H) by the reduction step, it is concluded that the difference observed in the —$CH_3$ group content between the unreduced and reduced polymers, i.e., 1 to 3 —$CH_3$/1000 $CH_2$, can be attributed to chloromethylene (—$CH_2Cl$)

branch-terminating groups in the unreduced polymers. During reduction of the material, these —$CH_2Cl$ terminating groups are converted to —$CH_3$ groups. Therefore, based on the analysis, conventional polyvinyl chloride polymers are concluded to contain, on an average, about 10 —$CH_3$ terminating groups and a maximum of 3

—$CH_2Cl$ terminating groups/1000 $CH_2$ groups.

The vinyl chloride polymers of this invention are found to be almost totally random in tacticity, i.e., these polymers have almost an equivalent percentage of syndiotactic and isotactic content. In these polymers, branching increases by an order of magnitude as the polymerization temperature employed in their preparation increases from 90° C. to 165° C. Thus, analysis of these polymers before reduction shows them to contain, per 1000 —$CH_2$ groups, from 10 to 13 branch-terminating —$CH_3$ groups, the highest —$CH_3$ group value being obtained for a polymer prepared at the upper limit of the polymerization temperature range. Similar analysis of the reduced polymers yields values of from 13 to 27 terminating —$CH_3$/ 1000 —$CH_2$. The increase in the —$CH_3$ group content of the polymers of this invention, after reduction, thus ranges from 3 to 14 —$CH_3$/1000 —$CH_2$. This increase is concluded to be due to the greater number of branch-terminating —$CH_2Cl$ groups in the polymers of this invention by comparison to the number of such terminating groups found in conventional vinyl chloride polymers. In contrast to the conventional materials, therefore, the vinyl chloride polymers of this invention contain, on an average, from 3 to 14 terminating —$CH_2Cl$ groups/1000 —$CH_2$.

Reduced viscosity values of the polymer products of this invention are employed herein as an indication of their molecular weight. These values are determined by preparing a solution of 1 gram polymer porduct in 100 ml. of cyclohexanone and then measuring at 30° C., the efflux time of this solution relative to that of the cyclohexanone solvent through a calibrated pipet. The reduced viscosity is then calculated as follows:

$T_0$ = solvent flow time in seconds
$T_1$ = solution flow time in seconds

Specific viscosity = $\frac{T_1}{T_0} - 1$

Reduced viscosity = $\frac{\text{Specific viscosity}}{C}$ where C is polymer concentration as expressed in grams of polymer per 100 ml. of solvent.

Depending upon the particular polymerization temperature and particular catalyst employed, the vinyl chloride polymer products have reduced viscosities ranging from about 0.12 to 0.58. It is to be noted that in instances where a homopolymer with an exceptionally low average polymer molecular weight may be desired, a chain terminating agent may be incorporated in the reaction mixture. Thus, polymer products having a reduced viscosity as low as 0.08 can be obtained. Chain terminating or transfer agents suitably employed in the process include lower aliphatic alcohols, e.g., isopropyl alcohol and halogenated, e.g., chlorinated or brominated hydrocarbons having 1–6 carbon atoms.

In order that those skilled in the art may more completely understand the present invention and the preferred methods by which it may be carried out, the following examples are given. In these examples and elsewhere herein, where proportions of ingredients may be given in parts, such proportions are by weight.

EXAMPLE 1

Preparation of vinyl chloride polymer product

A one-gallon stainless steel reactor rated at 5,000 p.s.i.g. is fitted with a mechanical stirred, a cooling coil, a thermocouple, a pressure gauge, ports for charging ingredients and a rupture disc connected to a vent line. To this reactor is charged 1.5 liters of deionized, degassed water containing 7.2 g. of dissolved polyvinyl alcohol. The reactor is then sealed and purged of oxygen several times by successive evacuations to 10 mm. Hg pressure and then releasing the vacuum with vinyl chloride. The reactor is then charged with 908 g. of distilled vinyl chloride with agitation, the reaction mixture is heated to 90° C., after which sufficient deionized, degassed water is pumped into the reactor to obtain a pressure of about 500 p.s.i.g. At this pressure, the reactor is substantially liquid-full.

While agitation is continued, 5 ml. of a solution of t-butyl peroxypivalate in Freon 113 (40 g. catalyst [75% active] per 200 ml. of solution) is pumped into the reactor. Polymerization is then allowed to proceed to at least 30% completion (about 15 minutes reaction time) with no additional catalyst charge. Thereafter, until polymerization is completed, 2 ml. of the catalyst solution is added about every 5 minutes, with additional water likewise being pumped into the reactor as needed to maintain substantially liquid-full reactor conditions. The total concentration of catalyst used is 0.37 percent, by weight of the monomer. After catalyst addition is stopped, the reaction mixture is agitated for an additional 15 minutes at 100° C., making a total reaction time of about 75 minutes.

The reactor is then cooled, the contents are discharged therefrom and the polymer product is iso'ated by centrifuging the reaction mixture. It is then washed repeatedly with deionized water and finally dried under vacuum to a moisture content of less than 0.1 weight percent.

This polymer product which is recovered in 95% of theoretical yield, has a reduced viscosity of 0.40, determined as described herein.

Use of polymer product as flame-retarding additive

To test its efficiency as a flame-retarding additive, a portion of the polymer product of this example is blended into each of two different commercially available low pressure polyethylenes and a commercial polypropylene. In each experiment, 30 parts of the polymer product per 100 parts of the total blend, is mixed into the polyolefin on a heated 2-roll mill. After milling the blend for 5 minutes, it is sheeted from the mill. Milled sheets of the polyolefins are also prepared as controls.

Specimens are cut from the milled sheets and tested for flammability according to the ASTM procedure, D635–63. Results are as follows:

TABLE 1

| Polymer | Milling temp., °F. | Flammability rating | Burning rate, in./min. |
|---|---|---|---|
| Marlex 2130 [1] | 280 | Burning | 0.73 |
| 2130 and PVC | 280 | Self-extinguishing | |
| Marlex T R960 [2] | 325 | Burning | 0.6 |
| T R960 and PVC | 325 | Self-extinguishing | |
| Marlex Mg402 [3] | 350 | Burning | 0.77 |
| Mg402 and PVC | 350 | Self-extinguishing | |

[1] Marlex 2130 Polyethylene, d., 0.921, Melt Index, 3.0—Phillips Petroleum Company.
[2] Marlex T R960 Polyethylene, d., 0.962, Melt Index, 6.0—Phillips Petroleum Company.
[3] Marlex Mg402 Polypropylene, d., 0.905, Melt Index, 5.0—Phillips Petroleum Company.

The specimens containing the PVC additive, which exhibit nondripping characteristics, burn or glow for about 1.5 minutes before being smothered.

Determination of physical properties on molded specimens of each of the foregoing polymers and polymer blends shows that incorporation of the vinyl chloride polymer product of this example results in significant increases in the stiffness of the polyolefins, as evidenced by much higher tensile moduli values of the polymer blend samples compared to those for the straight polyolefins.

EXAMPLE 2

This example illustrates that a thermally-degraded vinyl polymer product typically is obtained when the reactor is not maintained substantially liquid-full during the process of this invention. To a reactor of the type employed in Example 1 is charged 1715 ml. of deionized, degassed water containing 4.8 g. of dissolved polyvinyl alcohol. The system is sealed and vacuum-degassed as described in Example 1, after which 613 g. of the purified vinyl chloride monomer is added with agitation. While agitation is continued, the pressure exerted on the system is about 400 p.s.i.g. The reaction mixture is heated to 100° C., 4 ml. of the 20 percent t-butyl peroxypivalate solution in trichloro trifluoroethane (employed in Example 1) is pumped into the reactor, and the resulting mixture is agitated for about 15 minutes. Thereafter, a total of 44 ml. of the catalyst solution is added in 2 ml. increments every 5 minutes, while the pressure in the reactor gradually decreases to 100 p.s.i.g. The total reaction time is slightly over 2 hours. The reactor is then cooled, and the polymer product is isolated, washed and dried as described in Example 1. Yield of product amounts to about 85 percent of theoretical. It has a reduced viscosity of 0.39. However, in contrast to the product of Example 1, this material is partially decomposed, as evidenced by a significant percentage of darkened particles therein. It is a useful product nevertheless and may be employed as the product of Example 1 in applications wherein the degree of coloration is not critical.

EXAMPLES 3 AND 4

In these examples, vinyl chloride homopolymers are prepared at temperatures of 130° C. and 160° C., respectively, according to the general procedure outlined in Example 1, and using similar equipment. In each experiment, the total catalyst requirement is added throughout the reaction, and deionized water is pumped into the reactor as needed to maintain the operating pressure. The polymerization recipes and reaction conditions are as follows:

|  | Example 3 | Example 4 |
|---|---|---|
| Polymerization temperature, ° C | 130 | 160 |
| Operating pressure, p.s.i.g | 600 | 1,200 |
| Total reaction time, minutes | 45 | 90 |
| Deionized water, ml | 1,000 | 1,000 |
| Aqueous suspending agent solution, g. (2% polyvinyl alcohol in water) | 360 | 342 |
| Vinyl chloride, g | 908 | 913 |
| Total concentration of catalyst, percent | 1.0 | 1.9 |
| Yield, percent of theoretical | 95 | 72.5 |
| Reduced viscosity, polymer product* | 0.25 | 0.14 |

*Determined as previously described.

EXAMPLE 5

The polymer products of Examples 1, 3 and 4 above and selected samples of conventionally-prepared PVC's are analyzed for branch-terminating —$CH_3$ group content by a specially developed infrared (IR) technique, using a high density, linear polyethylene (PE) to compensate the interference of the amorphous —$CH_2$-absorption bands normally observed in the spectra of polyvinyl chloride resins in the region from 1380 cm.$^{-1}$ to 1250 cm.$^{-1}$. By the method, this group of bands, which is analogous to those of PE, is eliminated and a sharp, symmetric band of the —$CH_3$ group is observed near 1380 cm.$^{-1}$. The procedure used is as follows:

A wedge is prepared from a high density PE, Marlex 6050 (Phillips Petroleum) by the method reported by M. C. Harvey and L. L. Peters, Anal. Chemistry, vol. 32, No. 12 (1960), 1725. The wedge has a taper shape and varies in thickness from 0.003 to 0.018 inch. It is cut to yield a specimen 1¼" x 3¼" which is then mounted on the metal frame of the Barnes variable path cell (with salt block removed). The frame is in turn mounted on Teflon slides within the cell holder. The specimen is rotated to vary its thickness.

For each of the polymer products to be analyzed, a film is prepared by casting a solution of the polymer in tetrahydrofuran (0.25 g. polymer/5 cc. solvent) onto a KBr plate. The solvent is evaporated in a low pressure oven for 30 minutes at 80° C., and the dried film is then checked for residual solvent by IR scanning the 5.5–6.0$\mu$ and 9.2–9.5$\mu$ regions. The completely dried film is mounted on a film holder.

The spectra of the PE and PVC are recorded with a equipped with grating, the slit being fixed at 332 microns with gain at 4. The recording pen is set manually at 90% transmittance at 1600 cm.$^{-1}$. The sample film is put in the sample beam and the PE wedge in the reference beam. The wedge is rotated until the pen's position is exactly at 90% transmittance. The scan is started at a scan speed of 50 cm.$^{-1}$/min. with 0 suppression. If uneven, the wings of the 1380 cm.$^{-1}$ band are leveled by returning the recording drum to 1369 cm.$^{-1}$ and adjusting the PE wedge until both wings of the 1380 cm.$^{-1}$ band are even. The drum is then returned to 1600 cm.$^{-1}$ and, if necessary, the adjust knob of the spectrophotometer is rotated to move the pen to the position of 90% transmittance. The scan is started from 1600 cm.$^{-1}$ to 1100 cm.$^{-1}$. A sharp, symmetrical band is observed in the PVC spectrum at 1380 cm.$^{-1}$. The intensity of this band is corrected to obtain the absorbance ratio proportional to the actual thickness of the film (K value). The absorbance of the moderate band near 1338 cm.$^{-1}$ in the spectrum is found to be roughly proportional to the thickness of the film specimen. The ratio of absorbance, A, at 1380 cm.$^{-1}$ to absorbance, A, at 1338 cm.$^{-1}$ is the K value. The branching in the unreduced PVC's tested are determined from these calculated K values and converted into $CH_3/1000$ $CH_2$ on the basis of 1.5 $CH_3/1000$ $CH_2$ as the branching index in Marlex 6050. The results of these determinations indicate that commercial or conventionally prepared PVC's have a K value in the 0.1200 range and a $CH_3$ group content/1000 $CH_2$ of about 10, as shown in the summarizing Table 2 below. The products of this invention have from 10–13 $CH_3/1000$ $CH_2$.

The polymer products of Examples 1, 3 and 4 and selected conventionally-prepared PVC's, with approximately equivalent average polymer molecular weights, were subjected to reductive hydrogenation in a nitrogen atmosphere by the well known method, using LiAlH$_4$ catalyst. This method is fully described in A. Nakajima et al., Macromol. Chem., 95, 40 (1966). The first phase of the reduction is conducted at 65° C. for 360 hours, using tetrahydrofuran as solvent. The second phase of the reduction is conducted at 100° C. for 155 hours, using a tetrahydrofuran-Decalin mixture. After each phase of reduction, the reduced polymer is isolated by pouring the reaction mixture into excess water, adding sufficient $H_2SO_4$ until a pH of 2 is attained, filtering the mixture, washing the polymer repeatedly, and then drying it.

Branching values in the reduced PVC samples were obtained using the calibration curve, $A_{1378\ cm.^{-1}}/A_{1368\ cm.^{-1}}$ versus $CH_3/CH_2$, established for the following linear hydrocarbons, $C_{16}$–$C_{30}$. Details for obtaining this calibration curve are given in Boccato, A. et al., Macromol. Chem., 108, 218–33 (1967). From the measured $$A_{1378\ cm.^{-1}}/A_{1368\ cm.^{-1}}$$

values and the following calibration equation:

$$A_{1378\ cm.^{-1}}/A_{1368\ cm.^{-1}} = 20(CH_3/CH_2) + 0.2939^{-66.14(CH_3/CH_2)}$$

the $CH_3/1000$ $CH_2$ in the PVC's analyzed was determined. These results are given in Table 2 following:

TABLE 2

| Sample | Polymerization temperature, °C. | CH₃/1,000 CH₂ Unreduced polymer | CH₃/1,000 CH₂ Reduced polymer |
|---|---|---|---|
| Conventional PVC (reduced viscosity of 1.55) | 55 | 9 | *10.0 |
| Conventional PVC (reduced viscosity of 0.63) | 55 | 9 | *10.0 |
| PVC made with 8 wt. percent chain transfer agent (reduced viscosity of 0.17) | 71–74 | 10 | 13 |
| Product of Example 1 | 90 | 10 | 13 |
| Product of Example 3 | 130 | 11 | 23 |
| Product of Example 4 | 160 | 13 | 27 |

*CH³/1,000 CH² values reported in the literature.

These results indicate that the vinyl chloride homopolymer products of this invention contain a greater percentage of terminating —CH₂Cl groups than do conventional PVC as evidenced by the greater number of —CH₃/1000 CH₂ found in the reduced polymers.

Intrinsic viscosities of the polymer samples are measured in tetrahydrofuran at 25° C., employing a modified Ostwald capillary viscometer.

Melting points of the reduced PVC's and PE were found to be the same, as determined by Perkin-Elmer Differential Scanning Calorimetry at three different heating rates. These tests indicated that the reduced products had a PE structure and essentially no degradation of the chain took place during reduction.

Following are number average and weight average molecular weight values determined by Gel Permeation Chromatography for some of the polymers, as listed in the above Table 2, and also for homopolymer products of this invention prepared at 100° C. and 120° C. Along with these values are the intrinsic viscosities of the polymers:

TABLE 3

| Sample | Polymerization Temp. °C. | Intrinsic viscosity (dl./g.) | Weight average molecular weight | Number average molecular weight |
|---|---|---|---|---|
| Conventional PVC (reduced viscosity=0.63) | 55 | 0.52 | 38,000 | 13,600 |
| PVC, 8% chain transfer agent | 71–74 | 0.188 | 13,400 | 5,000 |
| PVC, 16% chain transfer agent | 55 | 0.162 | 10,200 | 4,100 |
| Polymer product of Example 1 | 90 | 0.438 | 36,800 | 18,700 |
| Polymer product of this invention | 100 | 0.39 | 25,100 | 12,500 |
| Do | 120 | 0.25 | 17,500 | 9,000 |
| Polymer product of Example 4 | 130 | 0.145 | 13,000 | 7,800 |
| Polymer product of Example 4 | 160 | 0.09 | 10,561 | 6,164 |

These values indicate that the homopolymer products of this invention made at higher polymerization temperatures may have an average molecular weight equivalent to that of some of the conventional polymers, as, e.g., those prepared with chain transfer agent. However, the more highly branched structure of the products of this invention results in their lower intrinsic viscosities.

The vinyl chloride polymer products of this invention are further characterized by having a narrower molecular weight distribution than the conventionally-prepared polymers. Molecular weight distribution of a polymer is indicated by the numerical ratio of its weight average molecular weight to its number average molecular weight. This ratio calculated from the molecular weight values determined for representative polymer products of this invention as listed in Table 3 above ranges from about 1.6 to 2.0:1. From the values likewise listed in Table 3 the ratio of weight average molecular weight to number average molecular weight for conventional polyvinyl chloride, prepared with and without chain transfer agent, ranges from about 2.5 to 2.8:1. Thus, from examination of these numerical values, it can be concluded that the vinyl chloride polymer products of this invention contain many more molecules of equivalent molecular weight than found in the conventionally-prepared materials.

On the basis of molecular structure data obtained on homopolymer products of this invention, it may be safely assumed that polymer chain segments of vinyl chloride in random copolymers prepared by the same process should have different structural configurations than similar vinyl chloride polymer chains obtained conventionally. Support for this assumption may be derived from the different, improved processing characteristics exhibited by these products.

EXAMPLE 6

Preparation of copolymer product

A copolymer of vinyl chloride and propylene is prepared in a 10-gallon, stainless steel reactor, fitted as described in Example 1. Three gallons of deionized water and a solution of 72.6 g. of polyvinyl alcohol in 3.6 liters of water are charged into the reactor, after which the reactor is sealed and purged of oxygen as described in Example 1. The reactor is then charged with 8808 g. of distilled vinyl chloride and 272 g. of propylene, with agitation. The reaction mixture is heated to 100° C. and sufficient deionized water is pumped into the reactor to obtain an operating pressure of 500 p.s.i.g. At this pressure, the monomers are in the liquid state and the reactor is substantially liquid-full.

While agitation is continued, 20 ml. of the t-butyl peroxypivalate catalyst solution as used in Example 1 is pumped into the reactor, and the reaction mixture is stirred for 15 minutes. Ten ml. of the catalyst solution is then added every 10 minutes until polymerization is completed, additional water likewise being pumped into the reactor as needed to maintain the operating pressure. The total reaction time is 2½ hours. The total concentration of catalyst used is 0.23 percent, based on the weight of the total monomer charge.

The copolymer product is recovered, purified, and dried as described in Example 1. Yield of the product is 90% of theoretical. It has a reduced viscosity of 0.44 and contains, by weight, approximately 3.0 percent of polymerized propylene.

Use of copolymer product as binder in vinyl-asbestos flooring

A vinyl-asbestos flooring material incorporating this copolymer is prepared from the following formulation:

| | Parts |
|---|---|
| Copolymer | 100 |
| Butyl benzyl phthalate plasticizer | 25 |
| Epoxy-type plasticizer | 5 |
| V-1285 [a] | 3 |
| Limestone | 360 |
| Asbestos | 120 |
| Titanium dioxide | 48 |
| Stearic acid | 0.5 |

[a] Solid nitrogen-containing organic stabilizer used in vinyl flooring formulations—Nuodex Products Co.

The above ingredients are blended together, the blend is charged to a 5-pound Banbury mixer and fluxed therein for 3 minutes at a temperature of 300°–325° F. The hot fluxed material is then transferred onto a 2-roll mill maintained at 250° F. After being mixed on the mill for 5 minutes at this temperature, the fluxed material is removed as sheeting 0.125 inch thick. For comparative purposes, another formulation is processed in a similar manner. This formulation is the same as outlined above, except that a conventional vinyl chloride copolymer (containing 15 percent vinyl acetate, by weight) such as normally used in flooring formulations is employed in place of the vinyl chloride-propylene copolymer of this example. The vinyl acetate copolymer has a reduced viscosity of 0.61.

Specimen samples from the milled sheets of each formulation are tested in accordance with the Revised Federal Specifications for Vinyl-Asbestos Floor Tile, L–T–00345(COM–NBS), Aug. 28, 1959. Using these procedures the following results are obtained:

TABLE 4

| Properties | Tile sample | |
|---|---|---|
| | VC-propylene copolymer | VC-vinyl acetate copolymer |
| Indentation (McBurney): | | |
| Room temp.: | | |
| 1 minute-inch | 0.007 | 00.07 |
| 10 minutes-inch | 0.0085 | 0.00875 |
| 115° F., 30 seconds-inch | 0.014 | 0.021 |
| Abrasion (Taber), gms./1,000 cycles | 0.23 | 0.40 |
| Deflection: | | |
| Flex bend, p.s.i. | 3,030 | 2,760 |
| Angle at break, degrees | 10 | 7 |

These values indicate that the copolymer product of this example produces floor tile which is harder and more resistant to abrasion than that produced from a copolymer as presently used commercially in vinyl-asbestos flooring formulations. However, the flooring produced from the copolymer of this example is more resilient, as evidenced by the greater force required to break the test specimen thereof under flex.

To determine the comparative moisture-resistance properties of the above tile formulations, sample specimens of each tile were weighed and then immersed in water at room temperature for periods of 1, 2, and 3 weeks. At the end of each storage period, the specimens were removed, wiped free of excess water, and reweighed. The percentage of water absorbed during storage was determined from the weight differences obtained, calculating on the basis of the original weight of the sample. Using this procedure, results are as follows:

TABLE 5

| Tile sample | Water absorption, percent after storage of— | | |
|---|---|---|---|
| | 1 week | 2 weeks | 3 weeks |
| VC-propylene copolymer | 0.35 | 0.60 | 0.78 |
| VC-vinyl acetate copolymer | 0.90 | 1.17 | 1.43 |

A tile formulation containing the compolymer product of this example is found to be more moisture-resistant than a tile formulation containing a vinyl chloride-vinyl acetate copolymer as conventionally used in the art. Accordingly, a floor tile product prepared from the copolymer product of this example should be more dimensionally stable during use.

Vinyl chloride-propylene copolymers are difficult to prepare by conventional methods, requiring long polymerization cycles, e.g., 18 hours or longer with low catalyst efficiencies. Conversions of up to only about 70% are typically realized. Such conventional copolymers are not adapted for use as binders in asbestos flooring formulations because of their poor processing characteristics at the processing temperatures employed.

EXAMPLE 7

A rigid vinyl foam is prepared from the polymer product of Example 1, using the following formulation:

| | Parts |
|---|---|
| Resin | 2500 |
| Stabilizer [a] | 75 |

[a] T–31—liquid organotin mercaptide stabilizer—Metal and Thermit Corp.

The ingredients are blended together and milled at 235° C. for 5 minutes. The fluxed material is sheeted off and pelletized. The diced material is then immersed in trichloroethylene for one hour, absorbing approximately 35 percent, by weight, of the liquid during this time.

The thus treated pellets are processed in a 1-inch extruder, equipped with a single stage screw and an ⅛-inch slit die. The screw speed is 20 r.p.m. and the extruder temperature, from hopper to die, ranges from 200° F. to 350° F. The die temperature is 295° F. The foam product obtained has a density of 20 pounds/cu. ft.

EXAMPLE 8

This example illustrates the use of the product of Example 1 as a processing aid for a high molecular weight polyvinyl chloride resin (reduced viscosity of 1.55 determined as previously described herein).

A rigid formulation is prepared containing, for each 80 parts of the high molecular weight resin, 20 parts of the resin product of Example 1. Three parts of a liquid organotin mercaptide stabilizer is employed for each 100 parts of the resin mixture.

The ingredients are blended together and milled for 5 minutes on a 2-roll mill at 350° F. A portion of the fluxed material is then compression molded at 350° F. with increasing pressure up to 50,000 p.s.i.g. in a total molding cycle of 8 minutes. For comparison purposes, a formulation containing only the high molecular weight resin and stabilizer (3 parts/hundred parts resin) is similarly milled and molded.

Test specimens of each molded formulation are prepared and tested for strength properties according to ASTM D638–64T. Results are as follows:

TABLE 6

| Property | High molecular weight | PVC blend |
|---|---|---|
| Tensile strength, p.s.i. | 7,630 | 7,600 |
| Tensile modulus, p.s.i. | $364 \times 10^3$ | $373 \times 10^3$ |
| Elongation at break, percent | 85 | 93 |

The melt rheology of each of the above rigid formulations is determined in a Sieglaff-McKelvey Capillary Rheometer at 420° F., using a capillary 1-inch long, 0.040 inch in diameter. For these measurements, the milled stock of each formulation is employed. Results are as follows:

TABLE 7

| | Viscosity, poises | |
|---|---|---|
| | High mol. wt. resin | Resin blend |
| Shear rate, sec.$^{-1}$: | | |
| $10^0$ | $58 \times 10^4$ | $35 \times 10^4$ |
| $10^1$ | $17 \times 10^4$ | $11.4 \times 10$ |
| $10^2$ | $4.3 \times 10^4$ | $3.0 \times 10^4$ |
| $10^3$ | $0.98 \times 10^4$ | $0.57 \times 10^4$ |
| Shear rate at melt fracture, sec.$^{-1}$ | 110 | 490 |

These results indicates that the blend containing by weight, 20 percent of the vinyl chloride homopolymer product of this invention exhibits significantly improved flow properties by comparison to the formulation of only the high molecular weight resin. Thus, use of such blends affords excellent processing characteristics.

At the same time, use of the product of this invention as a processing aid for the high molecular weight resin does not noticeably degrade its physical properties, as indicated by the equivalent property values listed in Table 6.

EXAMPLE 9

In this example, a vinyl chloride-vinyl acetate copolymer product is prepared at 100° C., employing the same general procedure and equipment as outlined in Example 1. After charging 1850 ml. deionized water containing 7 g. of polyvinyl alcohol and 180 g. of vinyl acetate monomer initially, the reactor is sealed and evacuated. The vinyl chloride (1020 g.) is then charged with agitation, after which the reaction mixture is heated to 100° C. and water is pumped into the reactor until 500 p.s.i.g. (operating pressure) is attained. A t-butyl peroxy pivalate catalyst solution (as employed in Example 1) is then added in 2 ml. increments throughout the reaction period. The total concentration of catalyst used is 0.68%, based on the total weight of the monomers charged. The reaction time is 45 minutes. The finished copolymer product, recovered in 83% yield, contains 13.6% polymerized vinyl acetate, by weight, and has a reduced viscosity of 0.37.

This product has excellent solution viscosity properties as shown by the following readings obtained for solutions containing different concentrations, by weight, of this copolymer in methyl ethyl ketone. Viscosities of similar solutions of a conventionally prepared vinyl chloride copolymer containing 13–15% vinyl acetate, by weight, are also given for comparison.

TABLE 8

| Solids concentration in solvent, by weight | Viscosity, centipoises* | | |
|---|---|---|---|
| | 15% | 20% | 25% |
| Copolymer product of this example | 20 | 41 | 71 |
| Conventional copolymer | 39 | 78 | 194 |

*Determined with Brookfield viscometer (Model RV), using No. 3 spindle at 100 r.p.m.

The low solution viscosity characteristics of the vinyl chloride-vinyl acetate copolymer product of this example suggest its application for paper coating, in paint formulating and in other areas where flowable polymer solutions of high solids level can be beneficially utilized.

EXAMPLE 10

Employing the general procedure and equipment as outlined in Example 1, a copolymer is prepared, from a monomer mixture of 817 g. of vinyl chloride and 91 g. of styrene. The other polymerization components and quantities used are as outlined in Example 1. The reaction temperatures initially is 100° C. and is allowed to increase to 130° C. during the run time of 4½ hours. Throughout the run, a total of 456 ml. of water is added to maintain substantially liquid-full reactor conditions. The finished copolymer product, recovered in 86% yield, contains 9.4% polymerized styrene, by weight, and has a reduced viscosity of 0.15.

This product has excellent solution viscosity properties.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for preparing vinyl chloride polymer products which comprises contacting in an aqueous suspending medium, vinyl chloride monomer or a monomer mixture containing, by weight, from 50 to 99.5% of vinyl chloride and from 0.5 to 50% of a monoethylenically unsaturated monomer copolymerizable therewith with a monomer-soluble, free-radical generating polymerization initiator at a temperature ranging from 90° C. to 165° C. and for a time period of 1–12 hours, while sustaining an operating pressure of 400–1500 p.s.i.g. on the reaction by applying hydrostatic pressure in excess of the pressure exerted by the monomer at the reaction temperature.

2. The process of claim 1 wherein the required amount of polymerization initiator is injected into the reaction mixture in prescribed increments throughout the reaction.

3. The process of claim 1 which is conducted for a time period of 1–3 hours.

4. The process of claim 1 wherein tertiary-butyl peroxypivalate is employed as the polymerization initiator.

5. The process of claim 1 wherein vinyl chloride monomer is polymerized.

6. The process of claim 1 wherein a monomer mixture of vinyl chloride and vinyl acetate is polymerized.

7. The process of claim 1 wherein a monomer mixture of vinyl chloride and propylene is polymerized.

References Cited

UNITED STATES PATENTS

| 2,422,392 | 6/1947 | Brubaker et al. | 260—87.5 C |
| 2,822,355 | 2/1968 | Werner | 260—87.5 C |
| 2,657,200 | 10/1953 | McGrew et al. | 260—85.5 R |
| 3,475,396 | 10/1969 | McCain et al. | 260—92.1 |

OTHER REFERENCES

Fordham et al.: J. Pol. Sci., 41, pp. 73–82 (1959).

HARRY WONG, JR., Primary Examiner

U.S. Cl. X.R.

117—161; 260—2.5 R, 30.4 R, 31.8 R, 32.8 R, 41 B, 45.75 K, 45.9 R, 78.5 CL, 86.3, 87.5 C, 87.5 R, 92.8 W, 896, 899; 264—129, 140

UNITED STATES PATENT OFFICE
CERTIFICATE OF CORRECTION

Patent No. 3,767,633     Dated October 23, 1973

Inventor(s) Joseph J. Dietrich

It is certified that error appears in the above-identified patent and that said Letters Patent are hereby corrected as shown below:

Col. 10, between lines 11 and 12, insert --Perkin-Elmer Model 521 Infrared Spectrophotometer, --

Col. 11, line 44, change "Example 4" to read --Example 3--.

Col. 13, line 27, change "00.07" to read --0.007--.

Signed and sealed this 6th day of August 1974.

(SEAL)
Attest:

McCOY M. GIBSON, JR.
Attesting Officer

C. MARSHALL DANN
Commissioner of Patents